(12) United States Patent
Sand

(10) Patent No.: US 11,756,180 B2
(45) Date of Patent: Sep. 12, 2023

(54) IMAGE PROCESSING SYSTEM AND IMAGING DEVICE

(71) Applicant: Changzhou Raytech Optronics Co., Ltd., Changzhou (CN)

(72) Inventor: Johan Sand, Tampere (FI)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 92 days.

(21) Appl. No.: 17/220,948

(22) Filed: Apr. 2, 2021

(65) Prior Publication Data

US 2022/0318981 A1 Oct. 6, 2022

(51) Int. Cl.
  *G01J 1/42* (2006.01)
  *G06T 1/00* (2006.01)
  *G06T 7/00* (2017.01)

(52) U.S. Cl.
  CPC .......... *G06T 7/0004* (2013.01); *G01J 1/4204* (2013.01); *G06T 1/0007* (2013.01); *G06T 2207/30141* (2013.01)

(58) Field of Classification Search
  CPC ................ G06T 7/0004; G06T 1/0007; G06T 2207/30141; G01J 1/4204
  USPC ................................................. 382/145, 100
  See application file for complete search history.

(56) References Cited

U.S. PATENT DOCUMENTS

| | | | |
|---|---|---|---|
| 2009/0225203 A1* | 9/2009 | Tanida | H04N 5/3415 348/262 |
| 2015/0256745 A1* | 9/2015 | Oniki | G02B 3/0037 348/335 |
| 2016/0252734 A1* | 9/2016 | Rossi | G02B 17/08 348/340 |
| 2021/0278633 A1* | 9/2021 | Tseng | G02B 13/0035 |

FOREIGN PATENT DOCUMENTS

CN 110888216 * 3/2020

* cited by examiner

*Primary Examiner* — Sheela C Chawan
(74) *Attorney, Agent, or Firm* — W&G Law Group

(57) ABSTRACT

An image processing system and an imaging device are provided. The image processing system includes a circuit board, an ambient light sensor, a light guide, a camera sensor and a camera lens. The ambient light sensor is integrated on the circuit board. An output end of the light guide is connected to the ambient light sensor to guide light to a detecting part of the ambient light sensor. The camera sensor is integrated on the circuit board. The camera lens is connected to the camera sensor. In the present disclosure, light guide is optically coupled with the ambient light sensor, such that a field of view of the ambient light sensor can be controlled to enhance color performance. Further, the light guide can provide spatial selectivity for the ambient light sensor while improving system integration and minimizing impact on appearance of the imaging device.

6 Claims, 1 Drawing Sheet

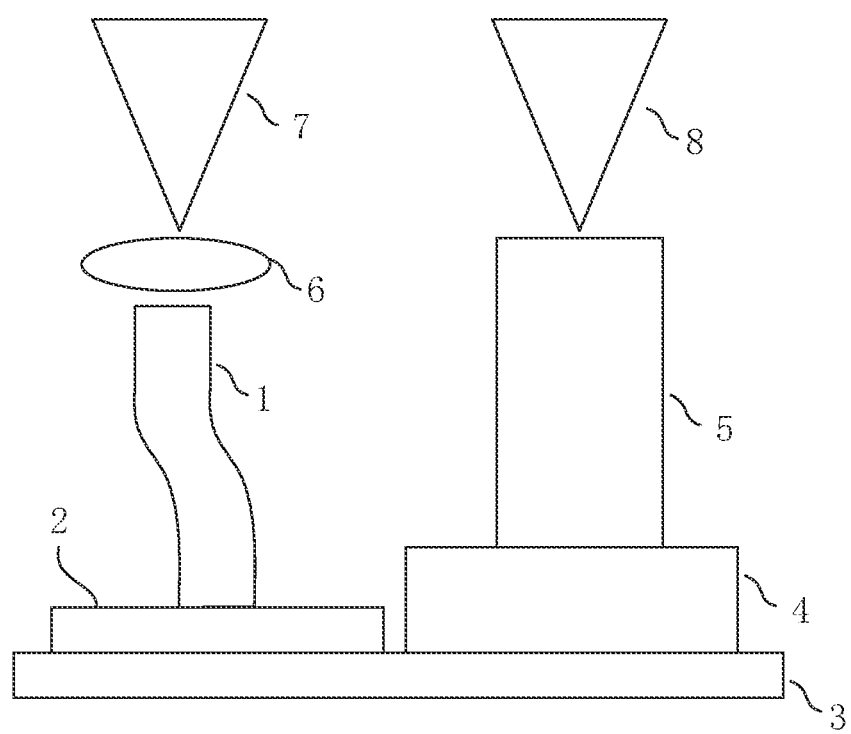

IMAGE PROCESSING SYSTEM AND IMAGING DEVICE

TECHNICAL FIELD

The present disclosure relates to the field of image processing technology, and in particular, to an image processing system and an imaging device.

BACKGROUND

An environmental spectrum has significant impact on color quality of camera images. However, it is a challenge to determine an illumination spectrum only from RGB images. The better spectral characterization of an ambient illumination is available, the better color correction can be achieved during an image signal processing.

An ambient light sensor (ALS) can assist in scene lighting evaluation by detecting lights in several spectral bands.

In existing smart device applications, the ALS needs to be mounted on a device cover where photons from the full hemisphere can be absorbed into an active area of the ALS. However, in camera imaging applications, the area of interest is only within the camera field of view. In this case, if the ALS is mounted on the cover of the device, photons from an area beyond the camera field of view would enter the ALS, causing the ALS to be unable to accurately evaluate illumination within the camera field of view. In addition, such arrangement of the ALS also interferes with device aesthetics and requires additional ALS signal routing to the device cover.

SUMMARY

The present disclosure provides an image processing system and an imaging device, in which an ambient light sensor can accurately evaluate illumination within the camera field of view.

In a first aspect of the present disclosure, there is provided an image processing system that includes a circuit board, an ambient light sensor integrated on the circuit board, a light guide connected to the ambient light sensor at an output end thereof to guide light to a detecting part of the ambient light sensor, a camera sensor integrated on the circuit board, and a camera lens connected to the camera sensor.

As an improvement, the image processing system further includes a lens connected to the input end of the light guide. The camera lens is arranged at a side of the lens facing away from the ambient light sensor.

As an improvement, the light guide is an optical fiber bundle.

As an improvement, the light guide is a periscope structure.

As an improvement, the light guide is made of glass.

As an improvement, the light guide is made of plastic.

As an improvement, the camera lens is arranged at a side of the input end of the light guide, and the input end of the light guide is spaced apart from the camera lens.

In a second aspect of the present disclosure, there is provided an imaging device including an image processing system. The image processing system includes a circuit board, an ambient light sensor integrated on the circuit board, a light guide connected to the ambient light sensor at an output end thereof to guide light to a detecting part of the ambient light sensor, a camera sensor integrated on the circuit board, and a camera lens connected to the camera sensor.

As an improvement, the imaging device further includes a cover that is formed with an opening. The input end of the light guide is aligned with the opening.

The technical solution of the present disclosure can achieve the following beneficial effects. In the image processing system and the imaging device according to embodiments of the disclosure, the light guide is optically coupled to the ambient light sensor, such that the ambient light sensor can be integrated on the circuit board, and external light can be received by the light guide. Meanwhile, a field of view of the ambient light sensor can be controlled to enhance color performance. When the image processing system is applied to the imaging device, image color quality of an image processing module of the imaging device can be improved. In addition, the light guide can provide spatial selectivity for the ambient light sensor while allowing the ambient light sensor to be integrated on the circuit board, which improves system integration and reduces the overall volume. At the same time, it is unnecessary to integrate the ambient light sensor on the cover of the imaging device, such that impact on the appearance of the imaging device is minimized.

It should be understood that the above general description and the following detailed description are only exemplary, and are not intended to limit the present disclosure.

BRIEF DESCRIPTION OF DRAWINGS

FIG. 1 is a schematic structural view of an image processing system according to an embodiment of the present disclosure.

REFERENCE NUMERALS LISTS

1—light guide;
2—ambient light sensor;
3—circuit board;
4—camera sensor;
5—camera lens;
6—lens;
7—field of view;
8—field of view.

The drawings herein are incorporated into the description and constitute a part thereof, and show some exemplary embodiments of the present disclosure, and are intended to explain the principle of the present disclosure together with the description.

DESCRIPTION OF EMBODIMENTS

Embodiments of the present disclosure will be described hereinafter in further detail with reference to the accompanying drawings in order to make the purpose, technical solutions, and advantages of the present disclosure more apparent. It should be understood that the specific embodiments described herein are merely intended to explain the present disclosure, rather than being construed as a limitation on the present disclosure.

In the description of the present disclosure, unless expressly stated and limited otherwise, the terms "first" and "second" are merely used for descriptive purposes, and cannot be understood as indicating or implying relative importance; unless otherwise defined or stated, the term "a plurality of" refers to two or more; the terms "connected", "fixed" and the like should be understood in a broad sense. For example, the term "connected" may be construed as a fixed connection, a detachable connection, an integral connection, or an electrical connection, or may be construed as being directly connected, or indirectly connected by an intervening element. Those skilled in the art shall be understood specific meanings of the above terms in the present disclosure according to specific circumstances.

In the description of the present disclosure, it should be understood that the orientation words such as "above" and "below" described in the embodiments of the present disclosure are described from the angle shown in the drawings, and should not be construed as a limitation on the embodiments of the present disclosure. In addition, in the context, it should also be understood that when an element is connected "above" or "below" another element, the element may not only be directly connected "above" or "below" the another element, but also be indirectly connected "above" or "below" the another element by an intervening element.

As shown in FIG. 1, according to an embodiment of the present disclosure, there is provided an image processing system that is applicable to an imaging device such as a video camera and a camera. The image processing system includes a circuit board 3, an ambient light sensor 2, a light guide 1, a camera sensor 4, and a camera lens 5. The ambient light sensor 2 is integrated on the circuit board 3. An output end of the light guide 1 is connected to the ambient light sensor 2 to guide light to a detecting part of the ambient light sensor 2. The camera sensor 4 is integrated on the circuit board 3. The camera lens 5 is connected to the camera sensor 4.

Furthermore, the light guide 1 is optically coupled to the ambient light sensor 2, such that the ambient light sensor can be integrated on the circuit board 3, and external light can be received by the light guide 1. Meanwhile, a field of view 7 of the ambient light sensor can be controlled to enhance color performance. When the image processing system is applied to the imaging device, image color quality of an image processing module of the imaging device can be improved. Specifically, the ambient light sensor records the spectral characterization of a field of view of the imaging device, and performs precise color correction on images and send an image processing signal, so that the image processing signal is processed by the image processing module of the imaging device to obtain the images with higher color quality. In addition, the light guide 1 can provide spatial selectivity for the ambient light sensor while allowing the ambient light sensor to be integrated on the circuit board 3, which improves system integration and reduces the overall volume. At the same time, it is unnecessary to integrate the ambient light sensor on a cover of the imaging device, such that impact on the appearance of the imaging device is minimized.

In an embodiment of the present disclosure, the image processing system further includes a lens 6 connected to the input end of the light guide 1 to optimize collection of the light while optimizing the field of view of the ambient light sensor 2. The camera lens 5 is arranged at a side of the lens 6 facing away from the ambient light sensor. The light can be transmitted to the ambient light sensor through the camera lens 5, the lens 6 and the light guide 1, sequentially.

In an embodiment of the present disclosure, the light guide 1 may include an optical fiber bundle. The optical fiber bundle may be formed of a plurality of individual optical fiber tubes, thereby improving transmission efficiency of the light.

In an embodiment of the present disclosure, the light guide 1 may be a periscope structure, which is beneficial for light collection while facilitating arrangement of the light guide 1.

In an embodiment of the present disclosure, the light guide 1 may be made of glass, which facilitates rapid transmission of the light while avoiding energy loss of the light.

In an embodiment of the present disclosure, the light guide 1 may be made of plastic, which facilitates bending the light guide 1 to adjust a transmission path of the light, and also facilitates the arrangement of the light guide 1.

In an embodiment of the present disclosure, the camera lens 5 is arranged at a side of the input end of the light guide 1, and the input end of the light guide 1 is spaced apart from the camera lens 5. The input end of the light guide 1 is arranged in close proximity to the camera lens 5, thus the field of view 7 of the ambient light sensor 2 and a field of view 8 of the camera 5 are overlapping in the far field, so that the spectral information collected by the ambient light sensor 2 is processed and provide precise color correction on an image to be acquired.

The present disclosure also provides an imaging device including the image processing system according to any one of the embodiments of the present disclosure. The imaging device may be a video camera, a camera, or the like. In this embodiment, the imaging device is a video camera.

In an embodiment of the present disclosure, the imaging device includes a cover that is formed with an opening, and the input end of the light guide 1 is aligned with the opening. The opening has a dimension matched with that of the input end of the light guide 1, and sufficient amount of light can be conveyed by the light guide 1 to the ambient light sensor 2 through the opening.

The above description is merely embodiments of the present disclosure, and should not be construed as limitation to the present disclosure. It would be appreciated by those skilled in the art that various changes or modification may be made to these embodiments. Any modification, equivalent replacement, improvement and the like made within the spirit and principle of the present disclosure shall be included within the scope thereof

What is claimed is:
1. An image processing system, comprising:
  a circuit board;
  an ambient light sensor integrated on the circuit board;
  a light guide, an output end of the light guide being connected to the ambient light sensor to guide light to a detecting part of the ambient light sensor;
  a camera sensor integrated on the circuit board; and
  a camera lens connected to the camera sensor;
  wherein the light guide is a periscope structure;
  the light guide is an optical fiber bundle.
2. The image processing system as described in claim 1, further comprising:
  a lens connected to an input end of the light guide,
  wherein the camera lens is arranged at a side of the lens facing away from the ambient light sensor.
3. The image processing system as described in claim 1, wherein the light guide is made of glass.
4. The image processing system as described in claim 1, wherein the light guide is made of plastic.
5. The image processing system as described in claim 1, wherein the camera lens is arranged at a side of an input end of the light guide, and the input end of the light guide is spaced apart from the camera lens.
6. An imaging device, comprising an image processing system, the image processing system comprising:
  a circuit board;
  an ambient light sensor integrated on the circuit board;

a light guide, an output end of the light guide being connected to the ambient light sensor to guide light to a detecting part of the ambient light sensor;
a camera sensor integrated on the circuit board; and
a camera lens connected to the camera sensor;
wherein the light guide is a periscope structure;
a cover formed with an opening, wherein an input end of the light guide is aligned with the opening.

* * * * *